United States Patent

Arulpragasam et al.

[15] 3,680,052

[45] July 25, 1972

[54] CONFIGURATION CONTROL OF DATA PROCESSING SYSTEM UNITS

[72] Inventors: Jeganandaraj A. Arulpragasam; Dennis C. Binks, both of Chandlers Ford; John J. Holmes, Winchester; John F. Minshull, Winchester; Martin C. Pinnell, Winchester; Clive Williams, Chandlers Ford, all of England

[73] Assignee: International Business Machines Corporation, Armonk, N.Y.

[22] Filed: Feb. 20, 1970

[21] Appl. No.: 13,251

[52] U.S. Cl. ....................340/172.5

[51] Int. Cl. ....................G06f 15/16

[58] Field of Search ....................340/172.5

[56] References Cited

UNITED STATES PATENTS

| | | | |
|---|---|---|---|
| 3,377,623 | 4/1968 | Reut et al. | 340/172.5 |
| 3,401,380 | 9/1968 | Bell et al. | 340/172.5 |
| 3,386,082 | 5/1968 | Stafford et al. | 340/172.5 |
| 3,566,363 | 2/1971 | Driscoll, Jr. | 340/172.5 |
| 3,566,357 | 2/1971 | Ling | 340/172.5 |

*Primary Examiner*—Gareth D. Shaw

*Attorney*—Hanifin and Jancin and Robert W. Berray

[57] ABSTRACT

The disclosed data processing system, which includes plural processing units, plural storage units and plural input/output units, can be configured into various groups of interconnected units. In response to a single pattern of signals broadcast to configuration control registers in each unit, a particular unit can be disconnected from one group of units and connected to another group. This invention relates to a data processing system, and more particularly to a system including plural units which, in response to a single program instruction, can be configured into various interconnected groups of units.

2 Claims, 6 Drawing Figures

INVENTORS
JEGANANDARAJ A. ARULPRAGASAM
DENNIS C. BINKS
JOHN J. HOLMES
JOHN F. MINSHULL
MARTIN C. PINNELL
CLIVE WILLIAMS
BY Robert W. Berray
ATTORNEY

CONFIGURATION CONTROL OF DATA PROCESSING SYSTEM UNITS

BACKGROUND OF THE INVENTION

Where extreme reliability is required in a data processing system it is customary to employ at least two processing units so that if one fails the other is available to service important tasks. The processing units may not be the only units duplicated. Other examples are storage units and input/output units.

When such a collection of units is assembled it is important that they be interconnected in such a way that the most effective use is made of the facilities provided, whilst at the same time ensuring that the complications introduced by interconnection do not outweigh the advantages gained by duplication of various units by introducing further possibilities of error.

A mechanism for performing configuration of plural units into various interconnected groups is disclosed in U.S. Pat. No. 3,386,082 which is assigned to the assignee of this application. To remove a particular unit from one group of interconnected units and place the same unit in another group requires two separate sequences of instructions.

SUMMARY OF THE INVENTION

It is an object of the present invention to provide a data processing system comprising two or more processing units and two or more peripheral units, a common highway system interconnecting said units and configuration control means in each unit responsive to a single pattern of signals broadcast by one or other of said processing units over said highway system to cause the associated unit to respond or not to respond to instructions and information from other units in the system.

It is another object of the invention to permit the removal of data processing system unit from one group of units and place the unit in another group in response to a single program instruction.

BRIEF DESCRIPTION OF DRAWINGS

The invention will be described by way of example with reference to the drawings, in which:

Referring to FIG. 1 there is shown a basic multi-processing system comprising two processing units P0 and P1 respectively having attached to them input/output channels 1, 2 for communication with a variety of input/output units. Such channels are typically of the multiplex type, being able to handle data from a number of units in a time-multiplexed fashion, or of the selector type, wherein a particular input/output unit can be associated with the processor for a limited time exclusively. Also in the system are two storage units S0 and S1, the units S0, S1, PO, P1 being interconnected by a highway system 3 shown diagrammatically as a single line although as will be apparent from the subsequent description, this highway system carries both control information and data between the units.

More particularly, the highway carries control information and data for two different purposes which may be considered as being applicable to different levels of operation of the system. One relates to the interconnection of the various units while the other relates to the task currently being executed.

Figure 1:
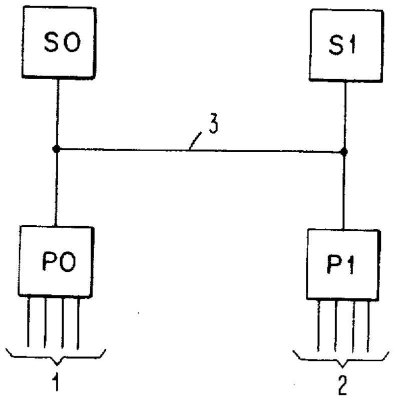
FIG. 1 shows the overall organization of a system embodying the invention.

In the system of FIG. 1 the units are configured into subsystems by making each unit available or otherwise for access in response to control information broadcast on the highway 3. Each unit from the group P0, P1, S0, S1 contains a multiple bit register called the configuration control register (CCR) the setting of which is under program control. The CCR causes the unit concerned to respond to or reject applied information selectively.

Figure 2:
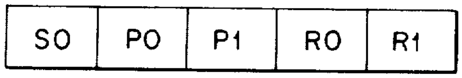
FIG. 2 shows the layout of a configuration control register.

The CCR for unit S1 is shown diagrammatically in FIG. 2. The CCR has three gate bit positions (S0, P0, P1) which correspond to each configurable unit in the system, excluding unit S!. Control circuitry, described hereinafter, is provided to regulate access to the unit in response to the setting of the various gate bits. For example, if the CCR in unit S1 includes a gate P0 bit which is set to 1, unit S1 will accept signals from unit P0 and handle them as if the two units were part of the same system. If, however, the bit had been 0 S1 will normally ignore all signals from unit P0 and is effectively not part of a subsystem including P0.

Bit positions R0 and R1 store reconfiguration bits which allow reconfiguration of the unit in which the register is located under the control of processor 1 or 2. Bit R0 relates to the ability of processor 1 to reconfigure the unit and R1 similarly to processor 2. The use of the reconfiguration bits will be described later in the specification with reference to FIG. 4.

Working combination of units is thus established when these units have the same pattern of gate bits set to 1 in their configuration control registers. In this condition the gating is reciprocal, that is each unit in the sub-system will accept signals from all other units in the sub-system. In addition, each will ignore signals from units which are not in the sub-system. The three gate bits also control the operation of the configured system as will be described in relation to FIG. 4.

Each of the processors P0 and P1 operates conventionally in accordance with a program of instructions to perform its data processing operations on data held in storage units to which they are configured.

If a processor runs out of available work on a particular program, or if an error occurs in the course of its execution, the routine sequencing of instructions is interrupted, and an interrupt handling routine is initiated which causes action to be taken appropriate to the type of interruption that has occurred.

There are thus two states of operation in the system. The first, when programs are running normally on the system and data concerned with these programs is passing along the highway system 3 is referred to as the problem program state. The other state occurs when, for a reason such as that outlined above or for some other reason, the supervisory program is active. This state is referred to as the supervisor state.

No problem program can cause a configuration control register to be changed. In this way individual programs operating on the machine are prevented from changing already established sub-systems. The only way that configurations can be changed in the system is by the issuance of an Establish Sub-System (ESS) instruction by the supervisor program and the subsequent description will be concerned with the manner in which such an instruction is implemented.

Figure 3:
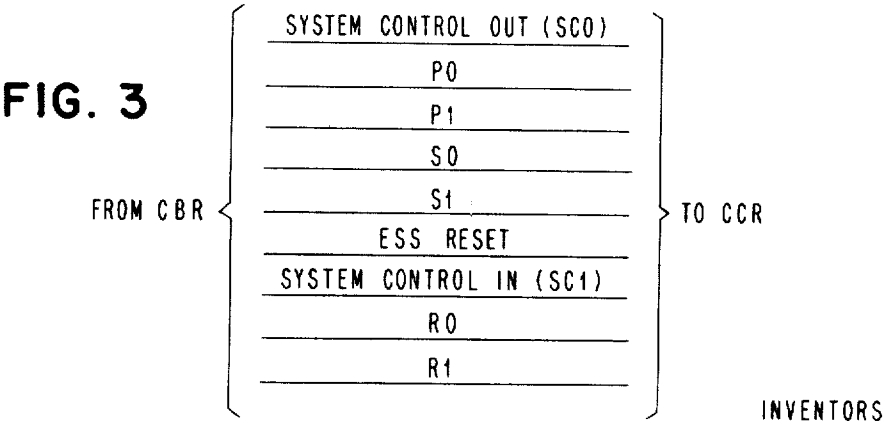
FIG. 3 shows diagrammatically a channel which provides a link between configurable units in the system.

Each configurable unit in the system is connected to the highway 3 so as to receive both control information and data relating to the interconnection of the various units. This latter information is carried on channels each of which provides a link in the highway connecting a processor to another configurable unit in the system. Such a configurable unit may be the other processor. One channel is shown in FIG. 3. Each channel consists of nine parallel lines carrying the control information and data and is referred to as a system control bus (SCB). Each processor has a configuration buffer register (CBR) which holds configuration patterns for the period of time required to complete a reconfiguration operation. The CBR in one of the processors activates the appropriate channels connected to the CCRs in each unit during a reconfiguration.

Figure 5:
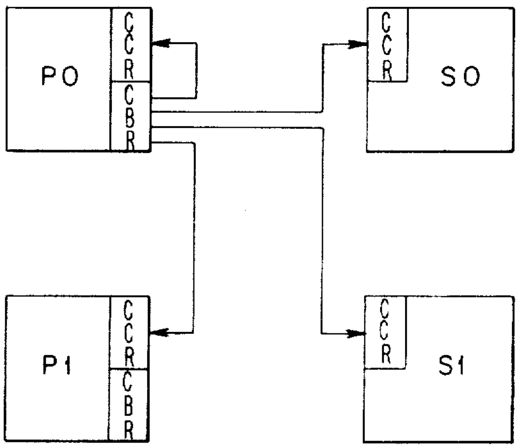
FIG. 5 illustrates the broadcasting of an ESS instruction.

The configuration buffer register in a particular processing unit is loaded with configuration data by the execution of an Establish Sub-System Instruction (ESS Instruction) when that processor is in the Supervisor state. This instruction has an operation code which identifies the Establish Sub-System operation and includes the address of a register in the processing unit which in turn contains the address of a block of locations in storage referred to as a Sub-System Block (SSB). There may be a number of Sub-System Blocks in storage and any one of a number of registers can accordingly be specified by the ESS instruction according to the type of configuration that a particular situation demands. In executing the ESS instruction the processing unit transfers the contents of the Sub-System Block to the configuration buffer register and causes the patterns of energization contained in the CBR to be broadcast over the system control bus. FIG. 5 illustrates the broadcasting of an ESS instruction from processor P0 to all configurable units. The CBR in processor P0 is loaded from the SSB described above using a microprogram or by means of internal processor control. When the CBR in processor P0 is fully loaded a system control out (SCO) line (FIG. 3) is energized to all configurable units notifying the CCR's of configuration data on the SCB. A configurable unit will accept the configuration data and change its CCR in a manner to be described later. On completion of this operation a system control in (SCI) line is energized by each configurable unit as a response. These responses are used to reset the system control out line in the CBR of the executing processor which in the above example, is processor P0. In addition the executing processor evaluates the responses and presents the response pattern to the programmer as evidence of a successful reconfiguration.

The operation of the remaining lines on each channel, the standby line and the ESS reset line will be described later.

The ESS instruction when specified at a program level energizes unconditionally the system control out line to all configurable units. A further level of operation is provided at processor control level so that the system control out lines can be selectively energized to allow selective reconfiguration.

After reconfiguration of a new sub-system a store sub-system, block instruction allows the programmer to determine the current configuration. The store sub-system block instruction is carried out by microprogram or internal processor control from the contents of the CCR of the executing processor to a sub-system block defined by the instruction.

A system can be formed in which storage does not include a sub-system block. This would typically be where a processor forms a sub-system of which it is not a part. In this instance the only record of the newly formed sub-system structure is in the configuration registers of the configured units. In order to access this information a store sub-system block instruction is provided which inserts the contents of the CPU issuing the store sub-system block into main storage at the requested address.

In addition the ESS instruction can define the next instruction address by a branch field. This provides the programmer with means to remove the storage containing the ESS instruction from the configuration but to retain a meaningful instruction address.

Clearly prior to the changing of the configuration of a system such as that described it must be ensured that no undesirable changes are made to programs already running on the system. Thus, the ESS instruction will be the last instruction of a series of so-called "housekeeping" instructions chosen to achieve this result.

Figure 4:
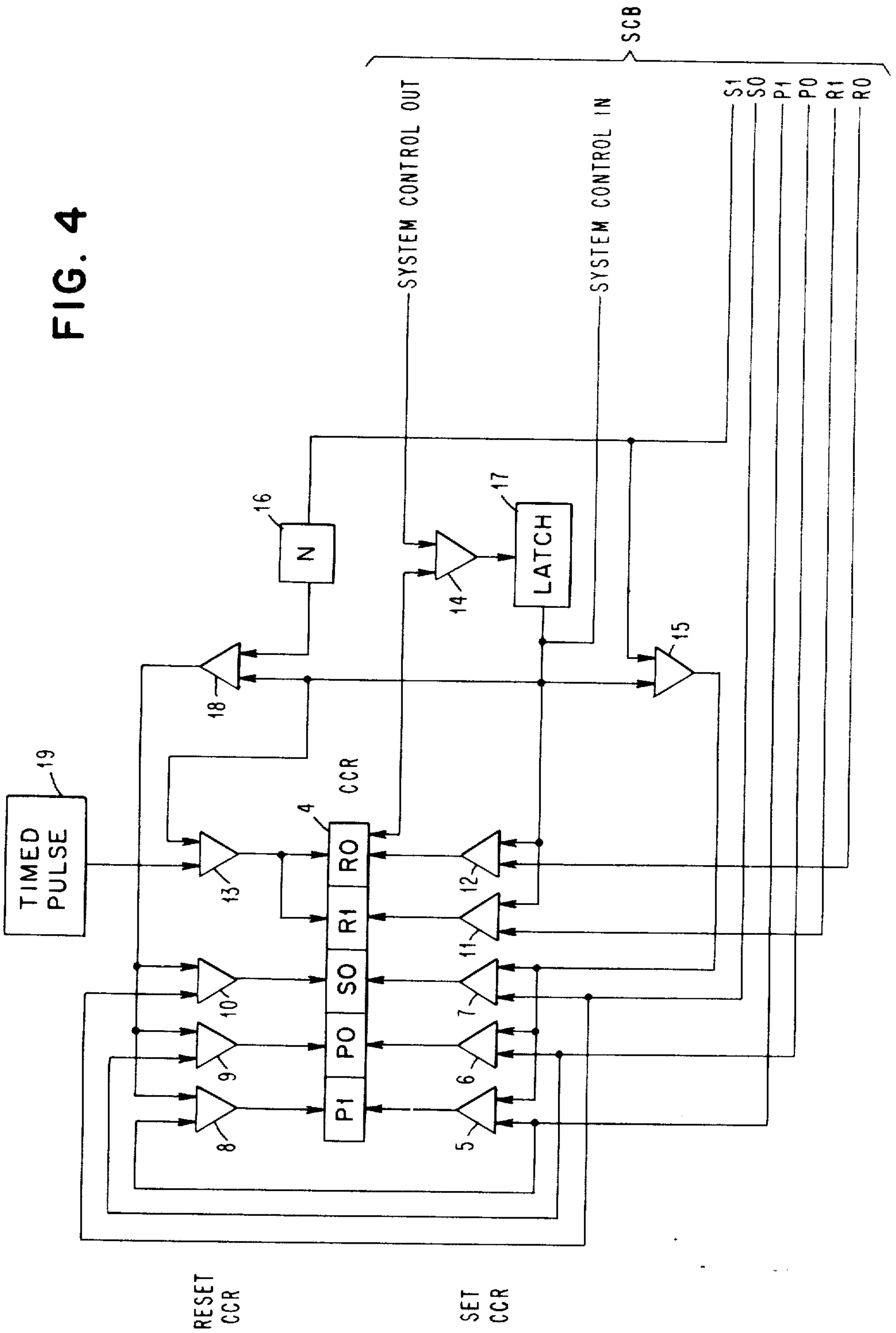
FIG. 4 shows the configuration control circuitry of a typical peripheral unit.

The response of the various units to the pattern of broadcast information is determined by logic circuitry associated with the configuration control register in each unit. This circuitry is shown in FIG. 4 for the storage unit S1 and it will be understood that similar circuitry is used in the other units with appropriate changes. Referring to FIG. 4 the configuration control register 4 has 5 bit positions, one corresponding to each of the gate bits P0, P1 and S0 and one corresponding to each of the reconfigure bits R0, R1. Each bit position in the register 4 has a bistable circuit of well known type, the circuit being arranged to respond to set inputs and reset inputs to assume binary 1 or 0 states respectively and to deliver an output representing the current state.

The following description relates to an ESS instruction broadcast by processor P0 to all configurable units. The response of storage unit S1 is described in detail, the remaining units respond in a similar way. A change in the CCR depends on the control information and data on the SCB and the current state of the R0 bit in that CCR. The system control out (SCO) and the gate line of the receiving unit, in this case S1 are used as control lines. The remaining lines represent data for the CCR. When the SCO is energized and R0, corresponding to processor P0, is in a "1" state, AND gate 14 sets latch 17 to a "1" state. Latch 17 when set in its "1" state controls the setting of the CCR. If the R0 bit is zero the latch 17 is not set and reconfiguration cannot occur even though the SCO line has been energized.

The output of latch 17 and a timed pulse from circuit 19 reset positions R0 and R1 of the CCR through AND gate 13. Positions R0 and R1 are then set by means of AND gates 11 and 12 which are energized by the output of latch 17 and the value of the bit on the R1 and R0 lines of the SCB.

The P1, P0 and S0 positions in the CCR are set as follows. The output of latch 17 is one input to AND gates 15 and 18. The other input to gate 15 is the bit on the S1 line of the SCB and the other input to gate 18 is the inverse of the bit in the S1 line. The output of AND gate 15 is one input to AND gates 5, 6 and 7. The other input to AND gates 5, 6 and 7 is the bit on lines P1, P0 and S0 respectively of the SCB. The output of AND gates 5, 6 and 7 sets the positions P1, P0 and S0 respectively of the CCR. The output of AND gate 18 is one input to AND gates 8, 9 and 10. The other input to AND gates 8, 9 and 10 is the bit on lines P1, P0 and S0 respectively of the SCB. The output of AND gates 8, 9 and 10 reset the P1, P0 and S0 positions respectively of the CCR.

The positions P1, P0 and S0 of the CCR may be set or reset by the circuits described above from data on the SCB. The setting or resetting is dependent on the polarity of the bit on the gate line corresponding to the particular unit, in this case gate line S1 of the SCB. In the case where a processor sets or resets its own CCR, the gate bit is the gate bit for that processor. The units may be configured into two sub-systems simultaneously e.g., by broadcasting a pattern of P0 =1; S0 =1; P1 =0; S1 =0 to configure two sub-systems P0 and S0; and P1 and S1. Therefore, unit S1 may be transferred from one sub-system, such as P1, P2, S1 and S2, to another, such as P0/S0 and P1/S1, by a single ESS instruction.

Figure 6:
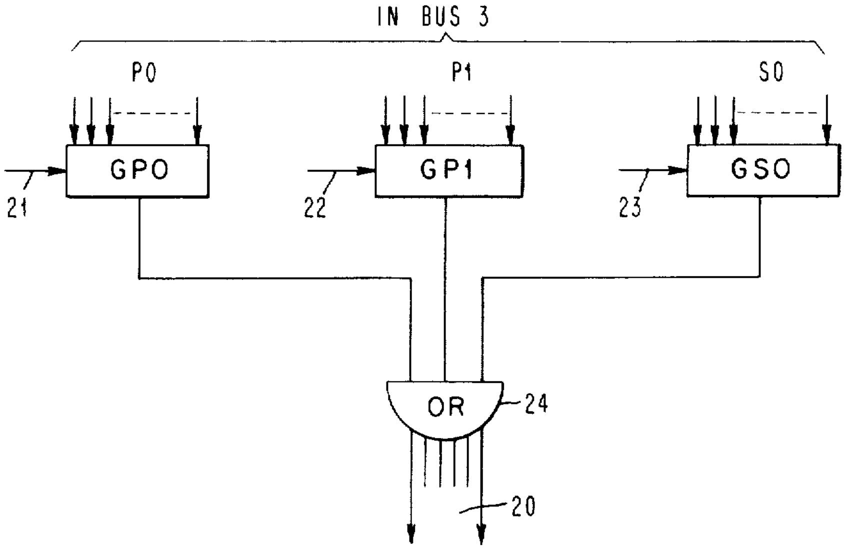
FIG. 6 shows information gating circuits to a typical peripheral unit.

FIG. 6 shows schematically the arrangements used to gate incoming information other than configuration control information data to the unit S1. Similar arrangements are used for the other units and these arrangements will accordingly not be described further. The highway 3, as has been discussed earlier carries both control information and data. For convenience in handling the latter data, it is segregated at each unit into incoming and outgoing data and the principle of operation of the embodiment described is that when a particular unit is configured with another unit it can both send data to and receive data from that other unit over the highway 3. If, however, it is not configured to that other unit, it will not accept data therefrom. In order to carry this principle into effect, the incoming data on the highway 3 is separated into three separate incoming buses, in the case of the unit S1 buses corresponding to P0, P1 and S0. Associated with each of these three buses is a collection of AND circuits constituting together a parallel gate having a separate AND circuit for each line in the bus. The outputs of all the AND circuits are taken from the gate in parallel and applied together with corresponding outputs from the gate associated with the other two buses to an OR gate 24 which passes data over a common bus 20 to the data handling circuits of the unit. The three parallel gates in unit S1 are referred to as Processor 0 Gate (GP0), Processor 1 Gate (GP1) and Storage 0 Gate (GS0) and are opened or closed in response to the energization or non-energization respectively of associated control lines 21, 22 and 23. Control line 21 is connected to P0 bit of the configuration control register 4, control line 22 is connected to P1 bit, and control line 23 is connected to stage S0. Thus, the determination of whether or not the units S1 will accept information from another unit is made conditional upon the setting of the corresponding bit position in the configuration control resister.

Configuration control can be used to advantage in the situation where all units are functioning properly but where the occurrence of some condition which has led to an interrupt requires a change of configuration for one reason or another, and in a situation where one or more of the units fails catastrophically.

In the latter situation it is desirable that the failing unit be removed before it can adversely affect the performance of other units and in the case of a processor particularly, it may be essential to have the work currently being performed by that processor taken over by the other processor. A further facility is provided by the system described to meet this eventuality.

Recognition of the need that failure of one processor must be met by the assumption of the tasks of that processor by the other processor of the system indicates that one of the processors is effectively a master processor and the other can be regarded as relatively less important. In this situation, the system is partitioned into a master sub-system and a slave sub-system by setting further bits in the configuration control registers (not shown) of the two processors associated one with each system. These bits are referred to as the standby bits, which can only be set into the CCR of a processor as a result of an ESS instruction. In the case of the master processor the standby bit is switched to 0, whereas in the case of the slave processor, the standby bit is switched to 1. The occurrence of an irrecoverable error in a particular processor results in the issuance of a malfunction alert signal by that processor which sets in train an interrupt handling routine appropriate to that category of interrupt. This means effectively that the supervisory program takes control of the system and in this particular set of circumstances the standby bit of the slave processor is caused to be interrogated by an instruction in the supervisor program. If the standby bit is 1 1, as it will be where the tested processor is the slave processor, an ESS instruction is issued which causes the slave processor to take over the units previously assigned to the master processor.

If a reset bit is present on the SCB (ESS reset line) when the accepting processors gate bit is a "1" (called positive ESS) a change in the CCR is inhibited. This condition can be sensed and a unit reset initiated. A reset latch in the accepting processor is set and a hardware processor reset followed by a microprogram processor reset occurs to bring the processor to its initial state. This procedure should lead to the normal stop state providing the processor is error free. A system control in response is sent to the executing processor once this state is reached. On the acceptance of ESS reset, a "reset interlock" latch is set to prevent the occurrence of multiple system processor resets. The reset interlock latch is only reset when the manual stop state is entered and a system control in signal has been sent to the remote. This is necessary since the ESS instruction is held during an ESS reset and both the data and system control out line remain energized. If due to an error the manual stop state is not reached when the system control in response will not occur.

A configuration push button is provided to enable a processor and a storage unit to be linked in a sub-system using information from the consul keys for the ESS instruction. This feature is particularly useful after power down when the previous configuration of the system is lost. ESS instructions are normally issued after a reference to a storage unit for the required data and control information. In this case a storage unit is configured by means of a load storage lever on the console of the processor which lever indicates the storage unit to be configured with that processor. Configuration can only occur if the reconfiguration bit of that processor (R0 or R1 in its CCR is set to "1.")

Each configurable unit has a unit reset hardware incorporated in it which is capable of being triggered from either processor in the system. A reset can be either a system reset or a sub-system reset. A sub-system reset does not affect units outside the sub-system but includes the processor emitting the reset signal. A sub-system reset signal will be accepted only if the configuration register of that unit allows it to accept signals from the emitting processor. If allowed, the sub-system reset signal will trigger a unit reset. In addition, a sub-system reset does not change the CCRs of the units in the sub-system since the sub-system would then cease to exist. There are two lines from each processor system reset and sub-system reset. Any unit will accept a system reset signal and will perform a unit reset and reset its CCR to the state where the unit can be configured by any processor in the system. The CCR reset consists of turning on the reconfiguration bits and turning off all the gate bits in the CCR. System reset enables all configurable units to be configured into new sub-systems by either of the processors.

What is claimed is:

1. A data processing system comprising two or more processing units and two or more peripheral units, a common highway system interconnecting said units, means in each processing unit to broadcast a pattern of configuration control signals over said highway system to cause the units to respond or not to respond to instructions and information from other units in the system, said configuration control signals being comprised of a binary signal corresponding to each unit in said data processing system, and in combination therewith:

a configuration control register in each of said units having a number of positions effective to assume a set or re-set state, each position corresponding to each other of the configurable units in the system, and gate means in each of said units, connected between said configuration control register and said configuration control signals broadcast means, responsive to the first or second state of said signal corresponding to a particular one of said units and the first state only of the signals corresponding to all other of said units for setting or re-setting predetermined positions of said register in said particular unit to thereby permit said particular unit to respond to other units corresponding to said register positions in the set state.

2. A system in accordance with claim 1 wherein said gate means includes:

register position setting gates corresponding to all other units in the system, each responsive to the first state of the corresponding configuration control signal and the first state of the configuration control signal of said particular unit for setting associated positions of said register, and register position re-setting gates corresponding to all other units in the system, each responsive to the first state of the corresponding configuration control signal and the second state of the configuration control signal of said particular unit for re-setting associated positions of said register.

* * * * *